United States Patent
Nair et al.

(10) Patent No.: US 7,539,550 B2
(45) Date of Patent: May 26, 2009

(54) SAFETY VERSUS AVAILABILITY GRAPHICAL USER INTERFACE

(75) Inventors: Suresh R. Nair, Amherst, NH (US); James E. Dogul, Hudson, NH (US); Richard Galera, Nashua, NH (US); George E. Rollins, Chelmsford, NH (US); Derek W. Jones, Dumfries Galloway (GB); George K. Schuster, Royal Oak, MI (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 136 days.

(21) Appl. No.: 11/360,276

(22) Filed: Feb. 23, 2006

(65) Prior Publication Data
US 2007/0198108 A1 Aug. 23, 2007

(51) Int. Cl.
*G05B 15/00* (2006.01)
(52) U.S. Cl. .............................. 700/83; 700/28; 700/99; 702/181
(58) Field of Classification Search .................. 700/83, 700/17, 28, 99–100; 715/700; 702/181–184
See application file for complete search history.

(56) References Cited

U.S. PATENT DOCUMENTS

| | | | |
|---|---|---|---|
| 6,782,295 B2 | 8/2004 | Martz, Jr. et al. | |
| 6,889,096 B2 * | 5/2005 | Spriggs et al. | 700/17 |
| 6,891,850 B1 | 5/2005 | Vandesteeg et al. | |
| 6,970,758 B1 * | 11/2005 | Shi et al. | 700/108 |
| 7,124,059 B2 * | 10/2006 | Wetzer et al. | 702/184 |
| 7,133,727 B2 * | 11/2006 | Van Dyk et al. | 700/21 |
| 2002/0010521 A1 | 1/2002 | Martz et al. | |
| 2003/0028269 A1 | 2/2003 | Spriggs et al. | |
| 2004/0010326 A1 | 1/2004 | Schuster | |
| 2004/0021679 A1 * | 2/2004 | Chapman et al. | 345/700 |
| 2004/0098740 A1 | 5/2004 | Chapman et al. | |
| 2004/0186927 A1 * | 9/2004 | Eryurek et al. | 710/12 |
| 2005/0071725 A1 | 3/2005 | Gibart | |
| 2006/0025872 A1 * | 2/2006 | Glanzer et al. | 700/21 |
| 2006/0026560 A1 * | 2/2006 | Kornerup et al. | 717/113 |
| 2006/0224254 A1 * | 10/2006 | Rumi et al. | 700/28 |

OTHER PUBLICATIONS

International Search Report dated Feb. 23, 2007 for PCT Application Serial No. PCT/US07/62746, 2 Pages.

* cited by examiner

*Primary Examiner*—Alexander J Kosowski
(74) *Attorney, Agent, or Firm*—Amin, Turocy & Calvin, LLP

(57) ABSTRACT

The claimed subject matter provides industrial automation systems and/or methods that visualize availability and safety levels. An optimization component can generate a voting configuration that provides an optimized combination of a safety level and an availability level based upon available redundancy. Additionally, a graphical user interface can present a visualization of the safety level and the availability level.

32 Claims, 16 Drawing Sheets

SAFETY VERSUS AVAILABILITY GRAPHICAL USER INTERFACE

TECHNICAL FIELD

The claimed subject matter relates to industrial control systems and, more particularly, to visualizing optimized availability and/or safety metrics that can be based on configured and/or adjusted utilization of redundancy.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

Industrial controllers can be employed to effectuate completion of most industrial processes. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involve assembly of previously processed materials. Oftentimes, such as in the case of automobiles, complex assemblies can be manufactured with high technology robotics assisting the industrial control process.

Industrial automation environments commonly utilize redundancy to provide availability and/or safety. For instance, two or more industrial automation devices (e.g., sensors, logic solvers, . . . ) can be employed in connection with a particular machine and/or process and disparate outputs from the devices can be combined. Each of the industrial automation devices can provide an output (e.g., vote) related to the particular machine, and the outputs can be combined to effectuate an action, to yield a measured condition, to continue and/or halt operation of the machine, etc. By way of example, a system designed for safety can include two controllers such that a machine can be shut off with the output from either of the controllers. Additionally, for instance, a single unit can include any number (e.g., two) of devices (e.g., processors) that can employ a similar fixed voting scheme that can provide safety. Accordingly, the outputs from the controllers and/or devices can be combined such that if either of the controllers and/or devices votes to shut off the machine, then the machine halts operation. Thus, safety can be provided since either one of the controllers and/or devices can be utilized to stop the machine, even if the other controller and/or device fails to turn off the machine, and the machine can be inhibited from further operation until correction of the failure. Pursuant to another illustration, the outputs from two controllers and/or two devices (e.g., that can be included in a single packaged device) can be combined such that the machine can remain operational when one of the controllers and/or devices provides a fault. Thus, the outputs of the controllers and/or devices can be combined to enable high availability where the machine can operate even when a fault occurs. Thus, industrial automation devices can be utilized to enable safety and/or availability; however, conventional architectures provide fixed voting relationships between the industrial automation devices. Additionally, users typically cannot visually observe levels of safety and/or availability associated with a particular voting relationship.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to systems and/or methods that facilitate displaying safety and/or availability levels related to an optimized utilization of available redundancy. The available redundancy can be configured to provide a level of safety and/or a level of availability. For instance, a configuration can be provided that implements a safety system that can be highly available, an availability system that can perform a safety function, a system that provides a very high degree of safety, a system that provides a very high degree of availability, etc. The configuration can be accomplished during an initial system configuration at design time. Additionally or alternatively, the configuration can be dynamically adjusted based on real time events associated with the industrial automation environment, machine, process, etc. The configuration related information can be employed to output a visualization at design time and/or during run-time. Further, information associated with the real time events can be displayed. As opposed to conventional systems that provide safety and/or availability by way of a hard coded, manufacturer pre-defined voting scheme, the claimed subject matter enables customization of a voting configuration that can be tailored to a particular industrial automation environment, device(s), process(es), etc.

In accordance with various aspects of the claimed subject matter, an optimization component can generate a voting configuration that can allocate available redundancy to provide an optimized combination of safety and availability. The optimized combination can be provided to a graphical user interface that can enable visualizing availability versus safety levels. For instance, the optimization component can determine the voting configuration based upon input data that can be obtained (e.g., from an industrial automation device, a user employing the graphical user interface, . . . ). The optimization component can generate a voting configuration that provides for any combination of safety and availability by configuring the available redundancy. Additionally or alternatively, an amount of available redundancy can vary (e.g., by adding or removing industrial automation devices, by utilizing a remote provider of redundancy, . . . ). The optimization component can further consider voting configurations that mitigate effects associated with common mode failure. The optimized voting configuration can be employed by the graphical user interface in connection with announcing safety and/or availability related data.

Pursuant to one or more aspects of the claimed subject matter, a voting configuration can be employed in connection with combining outputs, votes, measurements, etc. from various industrial automation devices. For instance, the voting configuration can provide an approach for addressing faults. Additionally, the industrial automation devices can be monitored to detect failures and/or adequate responses to failures can be yielded. The graphical user interface can present run-time related information that can include the failures and associated responses, for instance. According to another example, upon an occurrence of a fault, a voting configuration providing a high level of safety can be utilized to halt a machine and/or process. Pursuant to a further illustration, a disparate voting configuration that yields a high degree of availability can provide fault tolerance such that operations can continue (e.g., at an original level, a degraded level, . . . ); however, it is to be appreciated that the claimed subject matter is not limited to the aforementioned examples.

To the accomplishment of the foregoing and related ends, certain illustrative aspects of the claimed subject matter are described herein in connection with the following description and the annexed drawings. These aspects are indicative, however, of but a few of the various ways in which the principles of such matter can be employed and the claimed subject matter is intended to include all such aspects and their equivalents. Other advantages and novel features will become apparent from the following detailed description when considered in conjunction with the drawings.

DETAILED DESCRIPTION

Figure 1:
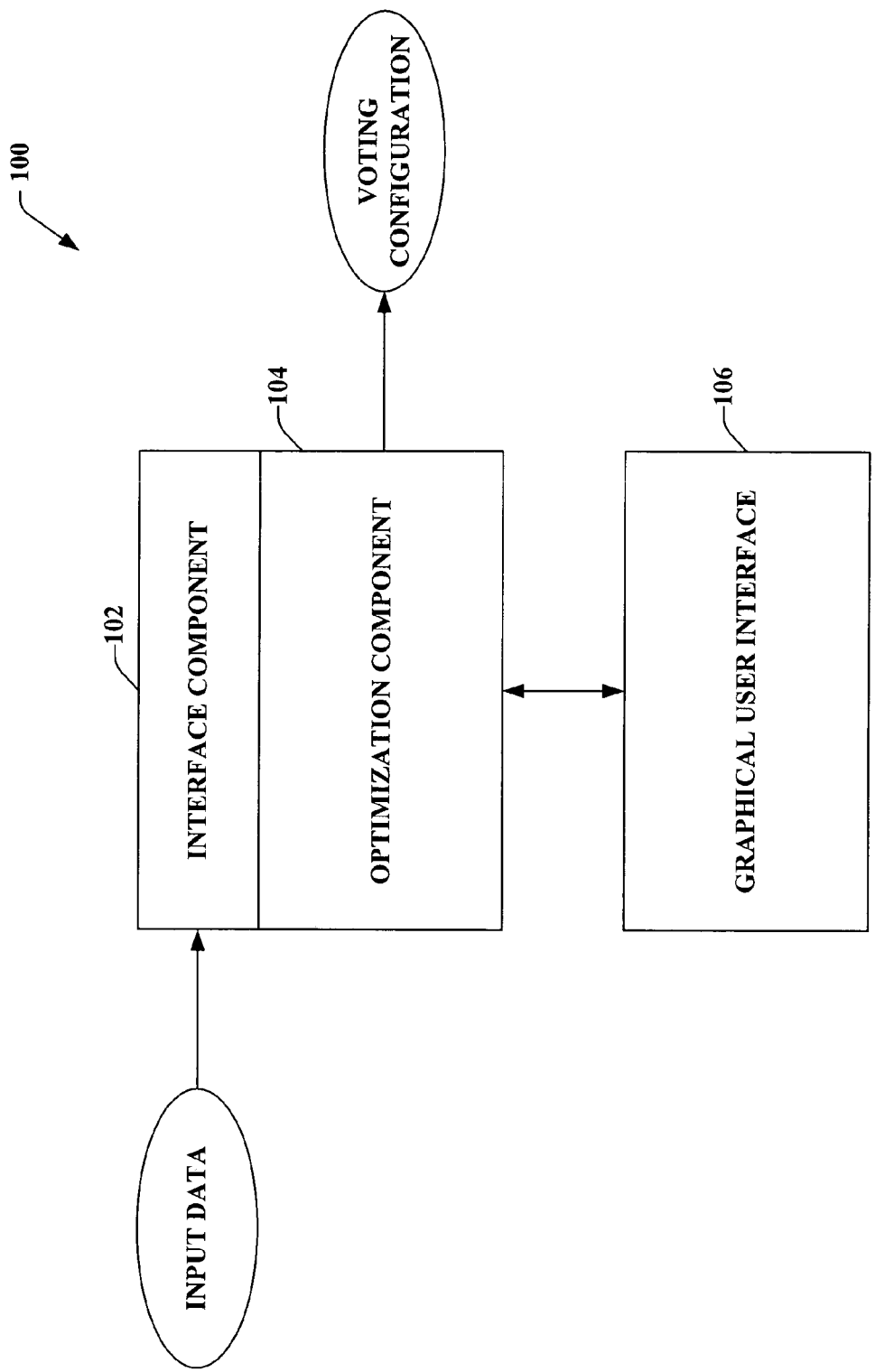
FIG. 1 illustrates a block diagram of an exemplary system that enables optimizing and/or visualizing availability and/or safety within an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the subject innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that enables optimizing and/or visualizing availability and/or safety within an industrial automation environment. The system 100 can include an interface component 102 that obtains input data, an optimization component 104 that evaluates the input data to generate a voting configuration, and/or a graphical user interface 106 that can provide a visualization of safety and/or availability levels associated with the voting configuration. The interface component 102 can receive the input data from any source. For instance, the interface component 102 can obtain the input data from one or more industrial automation devices. The industrial automation device(s) (not shown) can be an input device (e.g., sensor, . . . ), a logic solving device (e.g., programmable logic controller (PLC), . . . ), an output device (e.g., actuator, cylinder, diaphragm, relay, solenoid, motor controller, robot, servo motion device, . . . ), etc. Additionally or alternatively, the interface component 102 can obtain input data from a user; for example, the graphical user interface 106 can be employed by a user to provide input data.

The input data can include information that can be utilized to configure and/or adjust a voting configuration. According to an example, the input data can be a measured property associated with the industrial automation environment, a monitored condition related to a particular machine and/or process within the industrial automation environment, etc. Further, the input data can relate to characteristics associated with the industrial automation devices (e.g., age, accuracy, location, history, status, . . . ). By way of example, the input data can be related to a risk of failure associated with the industrial automation device (e.g., a number of previous failures associated with the particular device, . . . ). According to another illustration, the input data can be associated with an amount of harm associated with a failure of the industrial automation device (e.g., damage caused to a person and/or property, downtime, . . . ). It is to be appreciated that any suitable input data can be utilized including, but not limited to, prognostic data, diagnostic data, feedback data, feed forward data, data from a network, data from a hardwire connection, data associated with a complex network interface, etc. Pursuant to another illustration, the input data can be provided by a user (e.g., user input to effectuate adjusting utilization of available redundancy, . . . ); thus, for instance, the user can facilitate altering the voting configuration to provide increased safety, availability, etc.

As described above, the optimization component 104 can evaluate the input data to generate a voting configuration. By way of example, the input data can include an indication of an amount of available redundancy. Additionally or alternatively, the optimization component 104 can identify an amount of available redundancy (e.g., from the input data). According to an illustration, the available redundancy can be related to a machine, a process, an environment, a combination thereof, etc. The optimization component 104 can thereafter configure a voting scheme that utilizes the redundancy. The optimization component 104 can yield a voting configuration that provides for safety, availability, a combination thereof, etc. Accordingly, the optimization component 104 can evaluate the input data to determine how to allocate the available redundancy to provide for an optimized amount of safety and/or availability. Thus, as opposed to conventional safety and availability systems where a voting scheme can be hard coded and pre-defined by a manufacturer of a component, the optimization component 104 can enable the voting configuration to be initially configured for an industrial automation environment depending upon available resources, dynamically reconfigured based on observed events, etc.

The voting configuration generated by the optimization component 104 can be employed by a disparate component (not shown) to enable combining outputs provided by N industrial automation devices, where N is any positive integer. Additionally or alternatively, the N industrial automation devices can utilize the voting configuration to generate a combined output. According to a further illustration, a set of operating limits (e.g., related to a machine, process, . . . ) can be generated based upon the voting configuration (e.g., utilizing the optimization component 104, a disparate component (not shown), . . . ). By way of illustration, the optimization component 104 can generate a voting configuration that relates to combining outputs from three controllers. The voting configuration can be utilized to regulate the combination such that if any of the three controllers outputs a fault, then an associated machine and/or process will stop operation; such a voting configuration can yield a high level of safety since the controllers not providing the fault can be employed to discontinue operation and/or because the machine and/or process can be non-operational while the fault exists. Additionally or alternatively, the voting configuration can be utilized to combine the outputs from the three controllers such that if one or more of the controllers does not provide a fault, then the machine and/or process can be operational and thus provide a high degree of availability since the machine and/or process can run while a controller yields a fault. According to another illustration, the voting configuration can utilize a two out of three voting scheme such that if two or more of the controllers do not provide a fault, then the associated machine and/or process can continue without being halted. It is to be appreciated that the claimed subject matter is not limited to the aforementioned examples and any voting configuration is contemplated.

Moreover, the graphical user interface 106 can enable visualizing safety and/or availability levels associated with the voting configuration generated by the optimization component 104. Thus, for instance, the graphical user interface 106 and/or the optimization component 104 can enable visualizing availability versus safety metrics by way of monitoring, logging, and/or annunciating a health of a safety function and a reliability level over an integrity range. The visualization yielded by the graphical user interface 106 can be employed for modeling (e.g., current conditions, trends, historical levels, adjustments, . . . ) and/or to obtain runtime feedback. By way of further example, the graphical user interface 106 can display safety levels (e.g., safety integrity levels) and/or availability levels associated with industrial automation environment(s), industrial automation device(s), machine(s), and/or process(es). Additionally, the graphical user interface 106 can continuously monitor the safety and/or availability levels and/or obtain periodic notifications associated with changes in levels (e.g., as related to the voting configuration generated by the optimization component 104, . . . ); thereafter, such information can be displayed by the graphical user interface 106. Pursuant to a further illustration, the graphical user interface 106 can yield information associated with a fault and/or a remediation related thereto. As compared to conventional techniques that typically fail to provide a user with a visual manner of inspecting availability levels versus safety integrity levels, the graphical user interface 106 provides such visual indications related to safety and/or availability.

It is to be appreciated that the graphical user interface 106 can obtain information from any source and/or provide information to any sink (e.g., in addition to or instead of the optimization component 104, . . . ) related to the safety and/or availability levels, changes in levels, faults, remediations of faults, etc. Thus, the graphical user interface 106 (and/or an engine (not shown) underlying the graphical user interface 106) can communicate with the optimization component 102, the interface 102, industrial automation device(s), etc. Additionally, the graphical user interface 106 can constantly obtain and/or provide information, receive information based on a time-out and/or request, etc.

The graphical user interface 106, for example, can provide a user with a region or means to load, import, read, etc. data, and can include a region to present data rendered for visualization. For example, the region to present data can include any type of graphical object (e.g., window(s), chart(s), graph(s), table(s), picture(s), text, . . . ). According to a further illustration, any type of notification can be provided utilizing the graphical user interface 106; thus, the graphical user interface 106 can display a change in safety and/or availability, an occurrence of an event, etc. Further, the graphical user interface 106 can obtain an input (e.g., from a user) utilizing dialogue boxes, static controls, drop-down-means, list boxes, pop-up menus, edit controls, combo boxes, radio buttons, check boxes, graphic boxes, etc. Moreover, the user can interact with the graphical user interface 106 to select and/or provide information by way of various devices such as a mouse, a roller ball, a keypad, a touchscreen, a keyboard, a pen, voice activation, etc. It is to be appreciated that the claimed subject matter is not so limited to the aforementioned examples and any presentation and/or interaction technique related to the graphical user interface 106 is contemplated.

Although the interface component 102 and the graphical user interface 106 are depicted as being separate from the optimization component 104, it is contemplated that the optimization component 104 can include the interface component 102 and/or the graphical user interface 106, or portions thereof. Also, the interface component 102 can provide various adapters, connectors, channels, communication paths, etc. to enable interaction with the optimization component 104. Additionally, it is to be appreciated that the interface component 102 and/or the optimization component 104 can be included in one or more industrial automation devices, stand alone components, a combination thereof, etc. According to an example, any number of optimization components (e.g., each associated with disparate industrial automation devices, . . . ) can be employed together to yield a voting configuration. Pursuant to this example, the disparate optimization components can communicate with each other to yield a voting configuration. In accordance with a further illustration, the optimization component 104 can be provided remotely.

Figure 2:
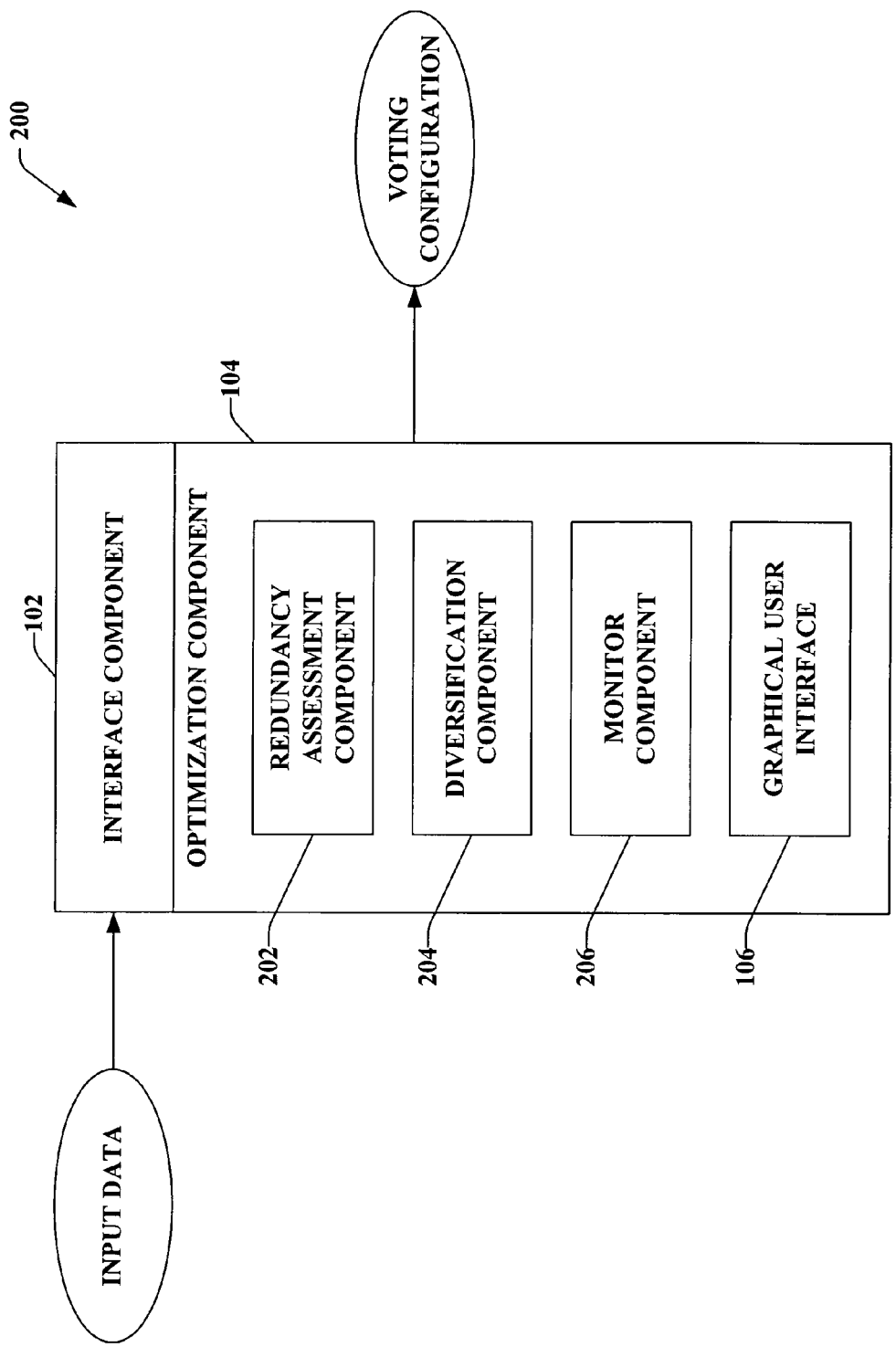
FIG. 2 illustrates a block diagram of an exemplary system that enables generating a voting configuration for utilization in an industrial automation environment.

Turning to FIG. 2, illustrated is a system 200 that enables generating a voting configuration for utilization in an industrial automation environment. The system 200 includes the interface component 102, which receives input data, and the optimization component 104 that can yield a voting configuration based at least in part upon the input data. The optimization component 104 can include the graphical user interface 106 to visually present information related to the voting configuration (e.g., pertaining to safety and/or availability, . . . ) to a user and/or obtain input from the user. The optimization component 104 can further comprise a redundancy assessment component 202, a diversification component 204, and/or a monitor component 206, any of which can be employed in connection with generating the voting configuration.

The redundancy assessment component 202 can evaluate resources associated with an industrial automation environment, a machine, a process, etc. and determine an amount of available redundancy. For instance, the redundancy assessment component 202 can determine a number of available industrial automation devices. The redundancy assessment component 202 can further identify characteristics associated with the industrial automation devices. Thus, by way of example, the redundancy assessment component 202 can determine that four PLCs within the industrial automation environment can be utilized with a particular motor; however, the claimed subject matter is not so limited. Pursuant to a further illustration, the redundancy assessment component 202 can be utilized in connection with initializing the industrial automation environment such that the input data can include information provided at setup related to redundancy. Thus, for instance, upon adding and/or removing an industrial automation device, input data related to the device (e.g., location, history, status, association with disparate devices and/or machines and/or processes, . . . ) can be provided to the redundancy assessment component 202 (e.g., by way of the interface component 102). It is to be appreciated that such information can be provided automatically upon adding and/or removing the industrial automation device, by a user, etc. According to an example, the redundancy assessment component 202 can thereafter store the input data related to the available redundancy (e.g., utilizing a data store (not shown), . . . ); however, the subject claims are not so limited.

The optimization component 104 can additionally include the diversification component 204, which can mitigate common mode failures. The optimization component 104 can employ the diversification component 204 to analyze a likelihood of an occurrence of common mode failure. The diversification component 204 can also evaluate probabilities of common mode failure associated with various voting configurations utilizing the available redundancy as determined by the redundancy assessment component 202. Thereafter, the optimization component 104 can generate the voting configuration based at least in part upon the results yielded by the diversification component 204 to mitigate occurrences of common mode failures.

The optimization component 104 can also employ the monitor component 206 to detect failures and/or provide appropriate responses to such failures. The monitor component 206 can identify any type of failure associated with an industrial automation device. Further, the monitor component 206 can detect any degradation associated with the industrial automation device. Although depicted as part of the optimization component 104, it is to be appreciated that the monitor component 206 can be included in an industrial automation device, a stand alone component, etc. Thus, for instance, the monitor component 206 can facilitate transmitting a fault (e.g., as part of the input data) to the interface component 102, which can thereafter be employed by the optimization component 104 (e.g., to adjust the voting configuration) and/or in connection with combining data in accordance with the voting configuration.

Moreover, the monitor component 206 can effectuate a response to an identified failure. For instance, if the monitor component 206 identifies a failure associated with a particular PLC, then the monitor component 206 can stop operation associated with the identified fault, permit further operation, allow for continued operation at a degraded level (e.g., reduced speed, torque, human exposure, . . . ), etc. According to another example, when the monitor component 206 determines that an industrial automation device is associated with a failure, the voting configuration can be employed to determine an appropriate response. Thus, by way of illustration, if the voting configuration provides for a high level of safety, the failure of one device can lead to stopping operation of an associated machine (e.g., halting operation of a pump based on an associated PLC generating a fault, . . . ); additionally, if a high level of availability is specified by the voting configuration, the associated machine and/or process can continue operation even though one of the industrial automation devices provides a fault. It is to be appreciated that fault related information (e.g., pertaining to faults, responses, ... ) obtained by way of the monitor component 206 can be provided to the graphical user interface 106 (e.g., to be included as part of a visualization, ... ).

Figure 3:
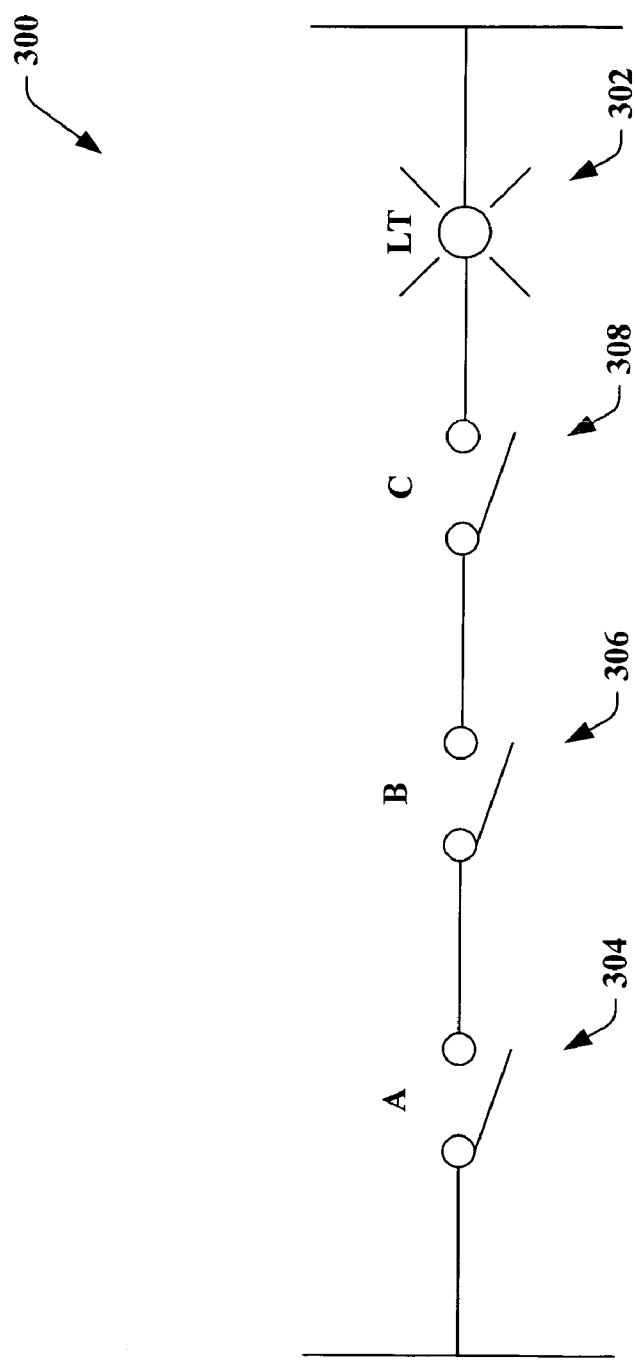
FIGS. 3-5 illustrate exemplary schematic diagrams illustrating various voting configurations.
Figure 4:
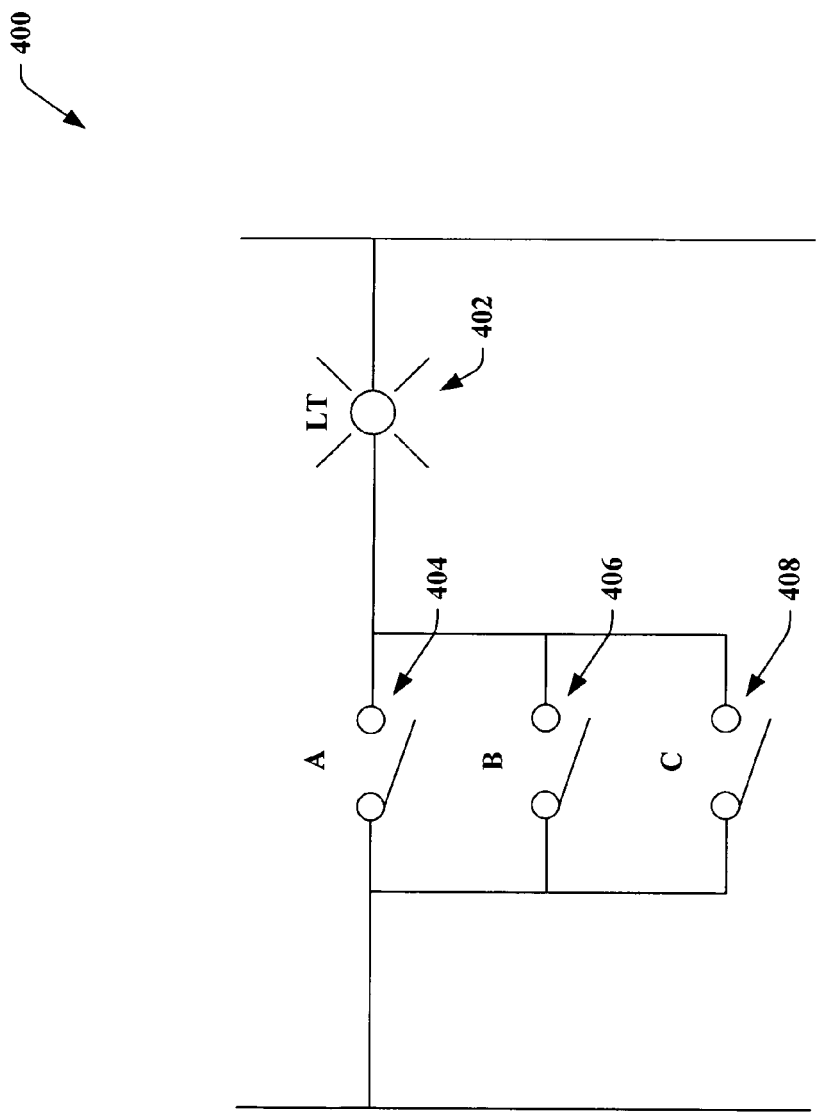
Figure 5:
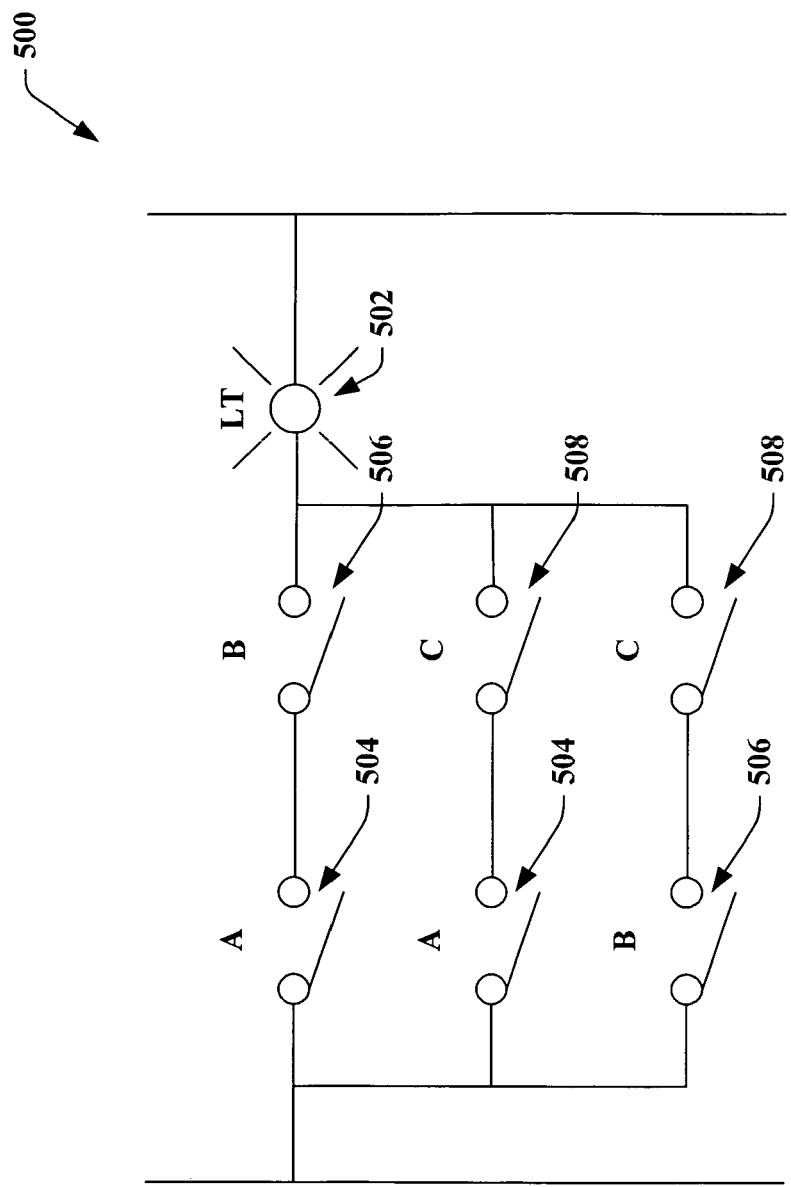

With reference to FIGS. 3-5, illustrated are exemplary schematic diagrams illustrating various voting configurations. It is to be appreciated that these illustrations are provided as examples and the claimed subject matter is not so limited since utilization of any type, number, configuration, etc. of industrial automation devices and/or voting configurations is contemplated. Depicted in each exemplary schematic diagram are a light ("LT") and three switches (A, B, and C) configured in various manners to provide different voting in connection with operating the light. Thus, the switches can provide redundancy that can be configured (e.g., utilizing the optimization component 104 of FIG. 1) to implement safety systems, availability systems, safety systems with high availability, availability systems that can perform a safe function, etc. The voting configuration can therefore facilitate providing disparate responses to failures associated with one or more of the switches. Additionally or alternatively, the voting configuration can be employed (e.g., by the graphical user interface 106 of FIG. 1) to provide a visualization of safety and/or availability levels.

Turning to FIG. 3, illustrated is an exemplary schematic diagram 300 depicting a voting configuration that provides a high level of safety (e.g., safety system). In this example, the voting configuration facilitates ensuring that an operator can turn off a light 302. Three switches (switch A 304, switch B 306, and switch C 308) can be configured to vote in series, thereby enabling any one of the switches to turn off the light 302. By way of illustration, if switch A 304 fails to turn off the light 302 as a result of a failure related to the switch A 304, the voting configuration provides that the second switch B 306 and/or the third switch C 308 can be activated and can turn off the light 302. Thus, the redundancy can ensure the system function (e.g., enabling the light 302 to be turned off). Additionally or alternatively, upon detecting a fault (e.g., fault associated with the switch A 304, the switch B 306, and/or the switch C 308), the voting configuration can prohibit the light 302 from being re-energized until the fault has been corrected. Pursuant to an example, a monitor component (e.g., the monitor component 206 of FIG. 2) can evaluate the switches (the switch A 304, the switch B 306, and the switch C 308) and identify any faults associated therewith; in the event a fault is located, the light 302 can be inhibited from operation (e.g., based upon the voting configuration).

With reference to FIG. 4, illustrated is an exemplary schematic diagram 400 that shows a voting configuration that provides a high level of availability (e.g., availability system). According to this illustration, a light 402 can be controlled by three switches (switch A 404, switch B 406, and switch C 408) that can vote in parallel; thus, the votes from the switches can be combined with an OR operator. Utilization of this voting configuration can enable the light 402 to remain operational even if a failure associated with one or two of the switches occurs (e.g., fails to turn on, ... ). Thus, in the event of a fault, the system can continue operating by employing such a voting configuration.

Turning to FIG. 5, illustrated is an exemplary schematic diagram 500 that depicts a high availability safety system. Accordingly, operation of a light 502 can be controlled by utilizing three switches (switch A 504, switch B 506, and switch C 508). The switches can be configured to vote employing a two out of three scheme. Thus, a certain level of safety can be provided, while not shutting down the system upon detecting a fault; rather, the system can continue to run without compromising the safety function so long as two switches have not provided faults.

Figure 6:
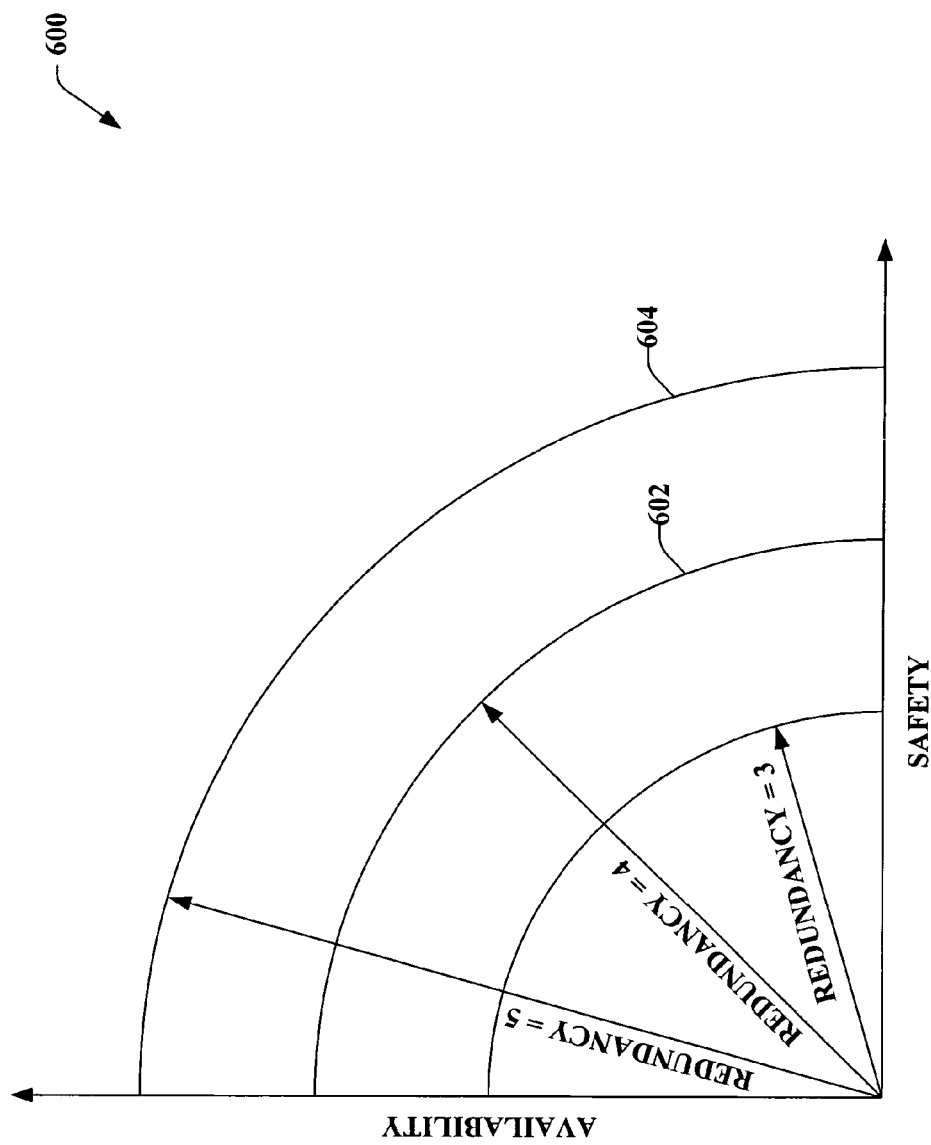
FIG. 6 illustrates an exemplary diagram depicting allocation of various amounts of redundancy.

With reference to FIG. 6, illustrated is an exemplary diagram 600 depicting allocation of various amounts of redundancy. As illustrated, a system can configure and/or be configured to implement varying combinations of availability and/or safety depending upon an amount of available redundancy. Thus, for instance, if the amount of redundancy equals four, a voting configuration can be generated (e.g., by way of employing the optimization component 104 of FIG. 1) that apportions the safety and/or availability anywhere along an associated arc (e.g., arc 602). Additionally or alternatively, the voting configuration can be dynamically modified to provide for any combination of safety and availability along the arc corresponding to the amount of available redundancy (e.g., arc 602). Further, to implement a disparate combination of safety and/or availability that lies upon a different arc (e.g., arc 604), additional redundancy can be added (e.g., raising the total redundancy to be equal to five). Moreover, the allocation of safety and/or availability can be displayed (e.g., utilizing the graphical user interface 106 of FIG. 1).

Figure 7:
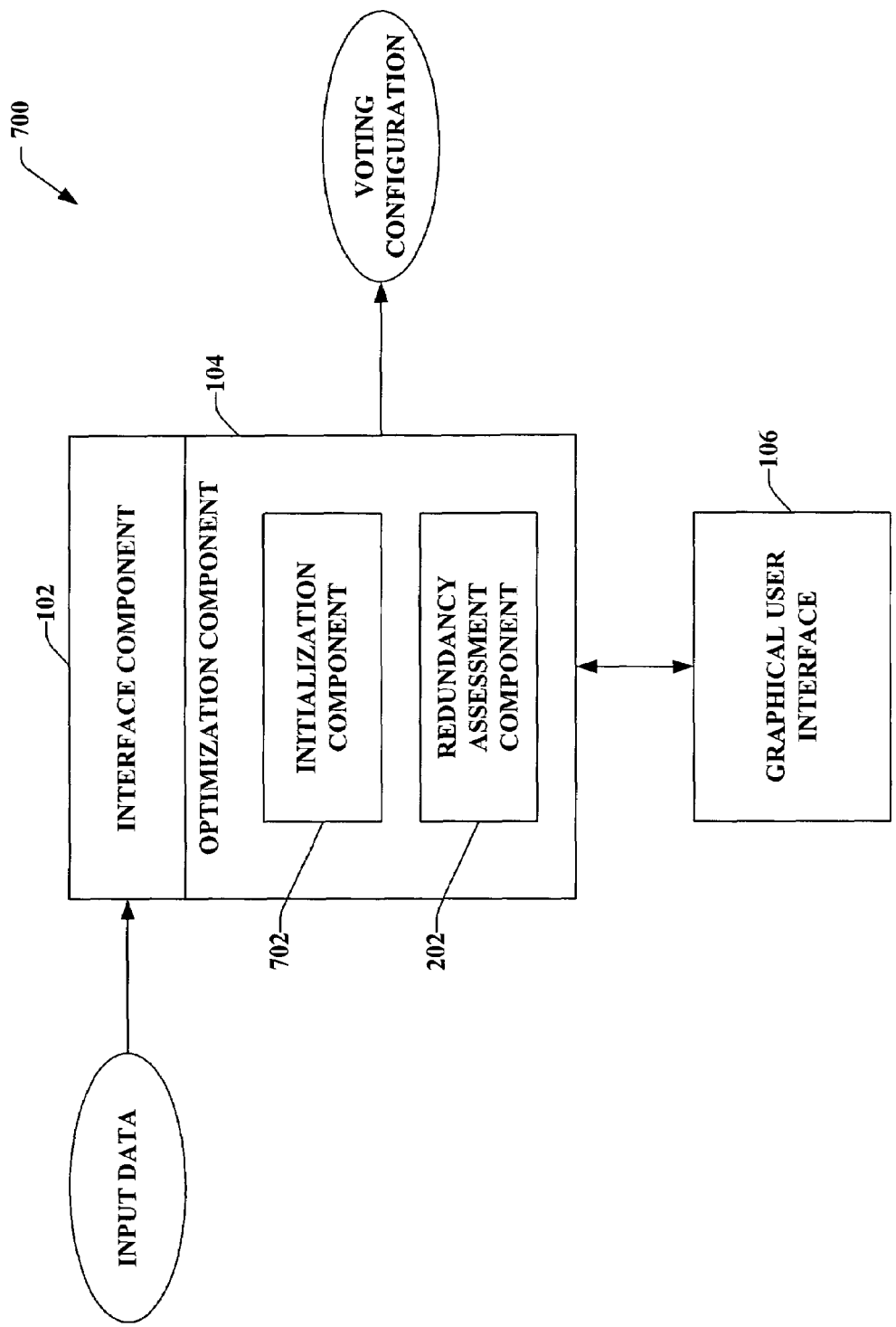
FIG. 7 illustrates a block diagram of an exemplary system that initializes voting associated with multiple, redundant decision makers in an industrial automation environment to provide fault tolerance.

Turning to FIG. 7, illustrated is a system 700 that initializes voting associated with multiple, redundant decision makers in an industrial automation environment to provide fault tolerance. The system 700 includes the interface component 102 that receives input data and the optimization component 104, which can further comprise the redundancy assessment component 202. The optimization component 104 can additionally include an initialization component 702 that can enable generating an initial voting configuration for the multiple, redundant decision makers (e.g., industrial automation devices) (not shown). The optimization component 104 can further be coupled to the graphical user interface 106, which can facilitate modeling characteristics associated with safety and/or availability based at least in part upon the initial voting configuration.

Any number of decision makers can be included within the industrial automation environment. Each of these decision makers can be a standard product that need not be preconfigured. Accordingly, when the decision makers are incorporated into the industrial automation environment, the redundancy assessment component 202 can be utilized to determine an available amount of redundancy (e.g., by way of sending signals to the decision makers within the environment, receiving information as part of the input data, ... ). Moreover, the initialization component 702 can employ the identified amount of redundancy to generate a voting configuration at a time of setup of the environment. The initialization component 702 can also consider disparate factors in connection with yielding the voting configuration. For instance, the initialization component 702 can evaluate a user profile, a likelihood of fault occurring, harm associated with a fault, user input, etc. when determining an optimized balance between availability and safety. Upon determining the balance, the initialization component 702 (and/or the optimization component 104) can generate the voting configuration.

The initialization component 702 and/or the optimization component 104 can additionally provide information related to configuration of the environment, industrial automation device(s), machine(s), process(es), etc. to the graphical user interface 106, which can utilize the obtained information in connection with generating a visualization. By way of example, the graphical user interface 106 can receive the voting configuration, information associated with safety function(s), a list of associated devices (e.g., safety devices), availability versus safety integrity levels per device, descriptions of modifications to a process corresponding to changes in integrity levels, other warnings, etc. Pursuant to another illustration, the initialization component 702 can populate such relevant information during setup, and thereafter provide the information to the graphical user interface 106.

Figure 8:
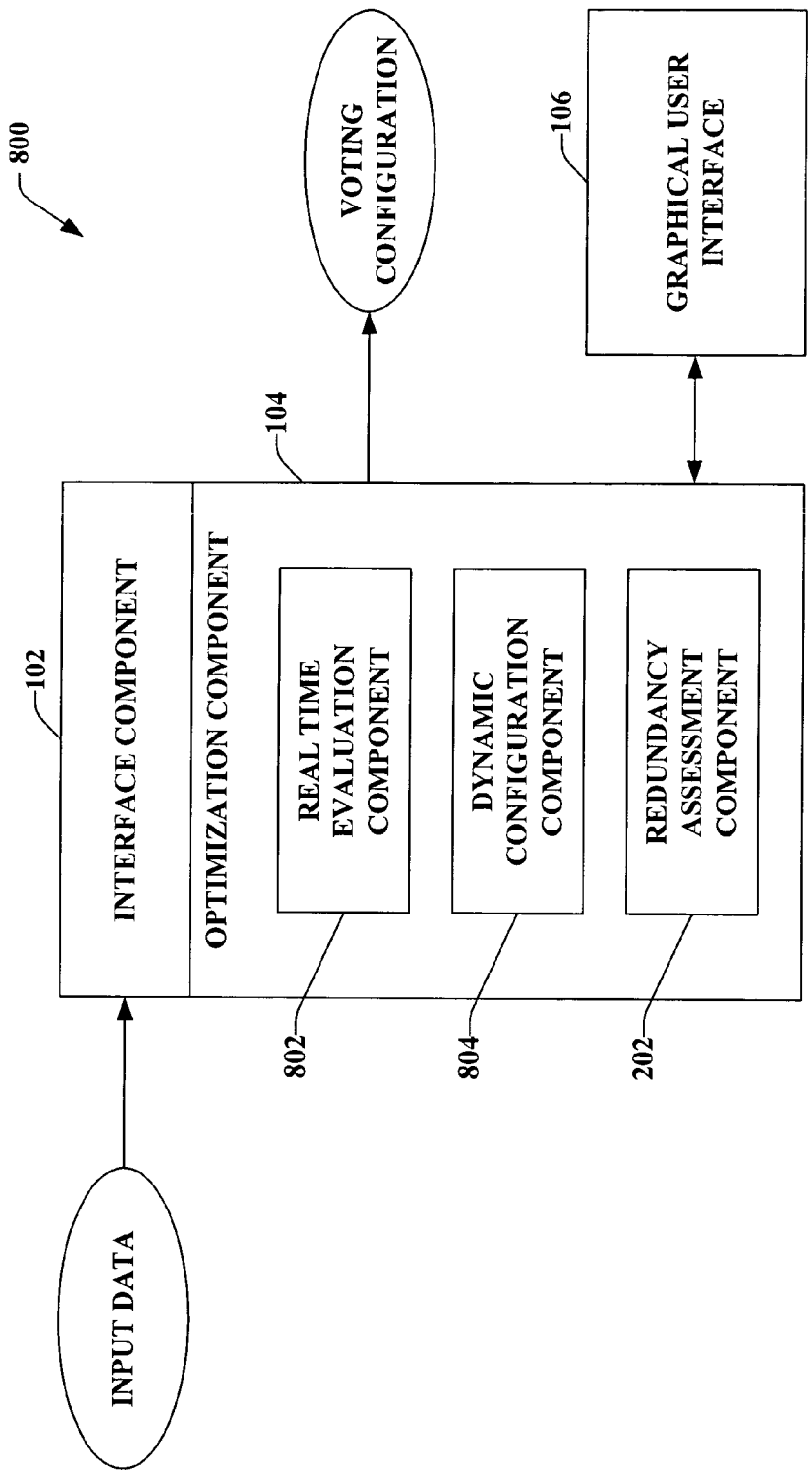
FIG. 8 illustrates a block diagram of an exemplary system that dynamically reconfigures voting in an industrial automation environment.

FIG. 8 illustrates a system 800 that dynamically reconfigures voting in an industrial automation environment. The system 800 can include the interface component 102 that can obtain input data. Additionally, the system 800 can comprise the optimization component 104 that generates a voting configuration based at least in part on the input data. To enable yielding the voting configuration, the optimization component 104 can include the redundancy assessment component 202 that can determine the available redundancy. Further, the optimization component 104 can comprise a real time evaluation component 802 and/or a dynamic configuration component 804. The system 800 can also include the graphical user interface 106 to provide a visualization of safety and/or availability allocation based at least in part upon real time events (e.g., runtime events), the voting configuration (e.g., a current voting configuration, logged modifications to the voting configuration, . . . ), etc.

The real time evaluation component 802 can monitor real time events associated with the industrial automation environment. The real time evaluation component 802 can, for example, evaluate a level of risk and/or a level of availability of a system or process at a particular time. The results obtained by the real time evaluation component 802 can be employed by the dynamic configuration component 804 to adjust utilization of the available redundancy; for instance, the dynamic configuration component 804 can enable generating an updated voting configuration. By way of example, the real time evaluation component 802 can determine that a worker is proximate to a motor. Thereafter, the dynamic configuration component 804 can yield a voting configuration that provides for more safety and a lesser amount of availability by way of adjusting utilization of the available redundancy; however, the claimed subject matter is not so limited.

The dynamic configuration component 804 (and/or the optimization component 104 and/or the initialization component 702 of FIG. 7) can utilize a rule set that can indicate a response (e.g., change in voting configuration) to a monitored event. Any type of monitored event can be associated with a corresponding voting configuration adjustment. It is to be appreciated that the rule set can be stored in a data store (not shown). Additionally, the rule set can be predefined and/or can be variable (e.g., depending upon historical data, . . . ). By way of example, the rule set can provide for shifting the allocation of the redundancy after a large failure that caused injury to provide for a very high level of safety while reducing the level of availability; however, the claimed subject matter is not so limited.

According to a further illustration, the real time evaluation component 802 can examine integrity, health, and credibility of data from industrial automation devices (e.g., sensor, logic solver, actuator, . . . ). The dynamic configuration component 804 can employ the information obtained by the real time evaluation component 802 to adjust a voting configuration. Pursuant to an example, the dynamic configuration component 804 can employ weighting factors to determine the integrity, health and/or credibility of the industrial automation devices. It is to be appreciated that the claimed subject matter is not limited to the aforementioned examples.

Moreover, the graphical user interface 106 can obtain data related to real time events that can be identified utilizing the real time evaluation component 802. Although depicted as being coupled to the optimization component 104, it is contemplated that the graphical user interface 106 can obtain real time event data from any source. For instance, the real time event data can be received from a safety device, a controller, and the like; however, the claimed subject matter is not so limited. Pursuant to another example, the real time event data can be provided to the graphical user interface 106 as an explicit message and/or an implicit message. Additionally or alternatively, the graphical user interface 106 can receive data in response to a time-out, a request, etc. Further, user input can be provided by way of the graphical user interface 106, which can be utilized by the optimization component 104 and/or the dynamic configuration component 804 in connection with generating an updated voting configuration.

Figure 9:
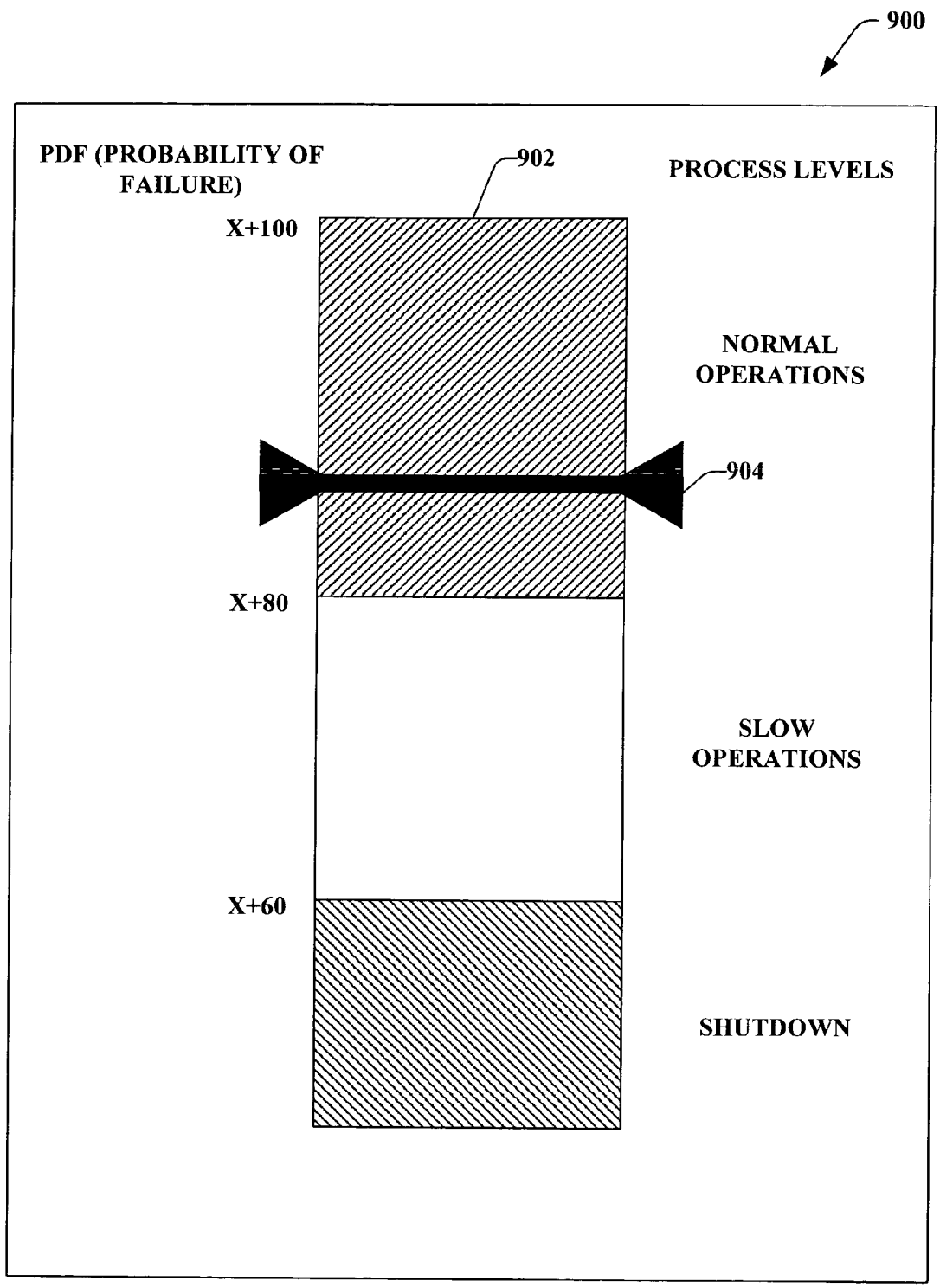
FIGS. 9-10 illustrate exemplary displays relating to safety and/or availability levels in an industrial automation environment that can be provided to a user by way of utilizing a graphical user interface.
Figure 10:
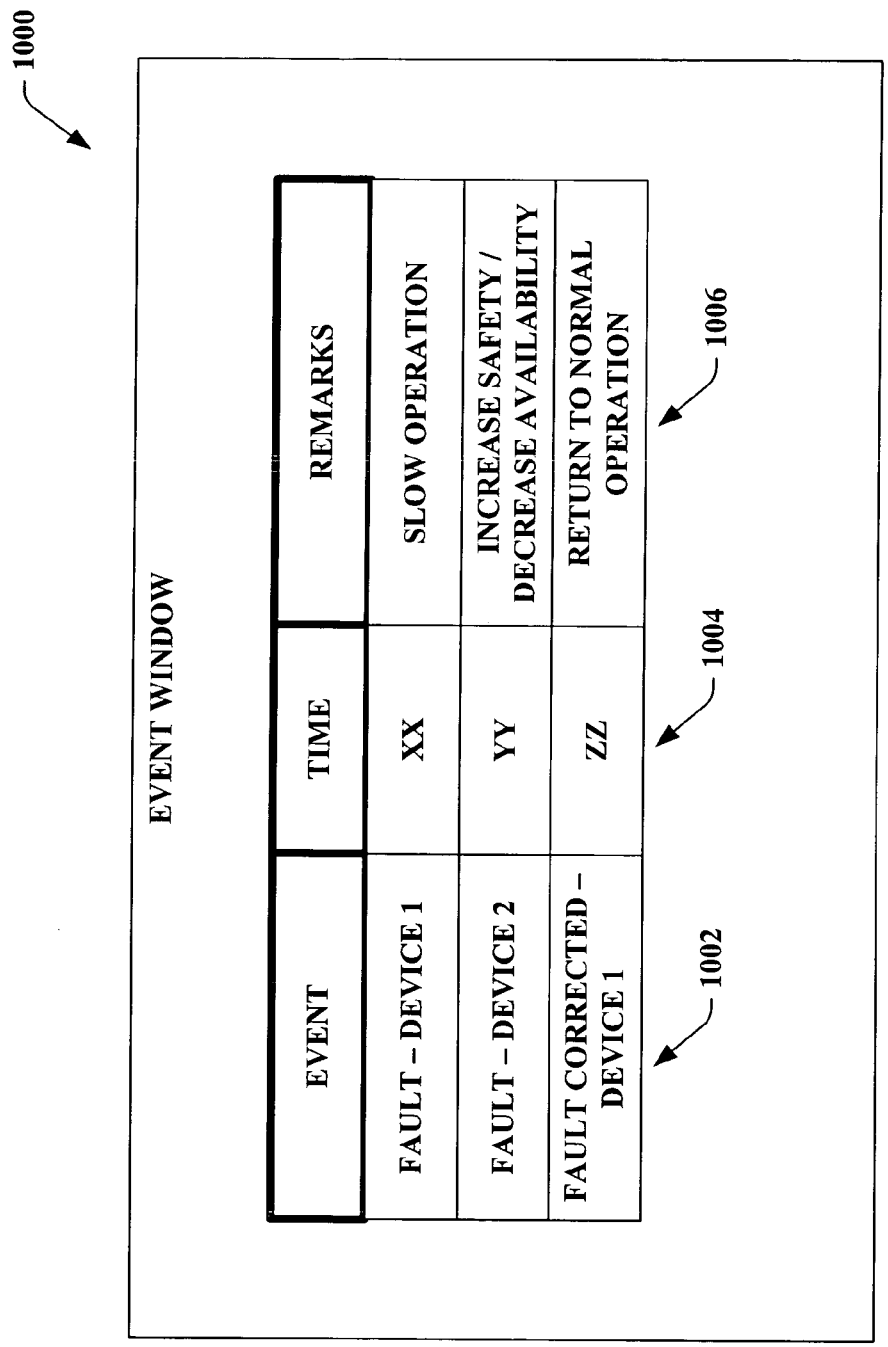

With reference to FIGS. 9-10, illustrated are exemplary displays relating to safety and/or availability levels in an industrial automation environment that can be provided to a user by way of utilizing a graphical user interface (e.g., the graphical user interface 106 of FIG. 1). It is to be appreciated that the claimed subject matter is not limited to these examples.

Turning to FIG. 9, illustrated is an exemplary display 900 that depicts a bar graph 902 related to safety levels for a safety function. The bar graph 902 can illustrate an availability level of a safety function against safety integrity levels by employing a marker 904; however, any disparate type of indicator can be utilized. The marker 904 can move up or down along the bar graph 902 based on an availability level. The availability level and/or the safety integrity level can be computed during system configuration, run-time, etc. (e.g., utilizing the optimization component 104 of FIG. 1, the graphical user interface 106 of FIG. 1, . . . ); thus, a visualization can be provided at setup, real time, etc. As depicted, various states (e.g., normal operations, slow operations, shutdown, . . . ) of a process can be indicated on a side (e.g., right hand side as illustrated, . . . ) of the bar graph 902. It is to be appreciated that the states can depend on a safety integrity level, a proximity to a closest lower level, and the like. Additionally, the various levels within the availability range can be displayed in disparate colors. Moreover, colored transitions can be utilized for proximity to changes in safety integrity level. The display 900 additionally can include a probability of failure on demand (PFD) level on another side (e.g., left hand side as illustrated, . . . ) of the bar graph 902. It is to be appreciated that FIG. 9 illustrates sample PFD values and that the subject claims are not so limited.

According to an example, the safety integrity level can be a sum of probabilities of failure associated with each device. For instance, the safety integrity levels can be based upon the IEC 61508 standard; however, the claimed subject matter is not so limited. Pursuant to another example, upon a halt of functioning associated with a safety device being visualized, a graphical user interface (e.g., graphical user interface 106 of FIG. 1) can be notified. Accordingly, the graphical user interface can maintain a list of devices for each safety function and subtract a failed device and/or add a device upon being back online. Additionally or alternatively, a disparate component (e.g., the optimization component 104 of FIG. 1, the monitor component 206 of FIG. 2, the real time evaluation component 802 of FIG. 8, . . . ) can notify the graphical user interface of the event.

With reference to FIG. 10, illustrated is an exemplary display 1000 that depicts an example of an event window (e.g., fault window). An event column 1002 that includes various faults (e.g., device failures), correction of faults, etc. can be included in the event window. The event column 1002 can include information related to a type of event, a device and/or process associated with the event, etc. The event window can additionally include a time column 1004 that can display a time of occurrence associated with a corresponding event. Further, a remarks column 1006 can be included in the event window; the remarks column 1006 can provide any type of information such as, for instance, information related to any transition associated with a safety level change, availability level change, process level change, etc. It is to be appreciated that the claimed subject matter is not limited to this example.

Figure 11:
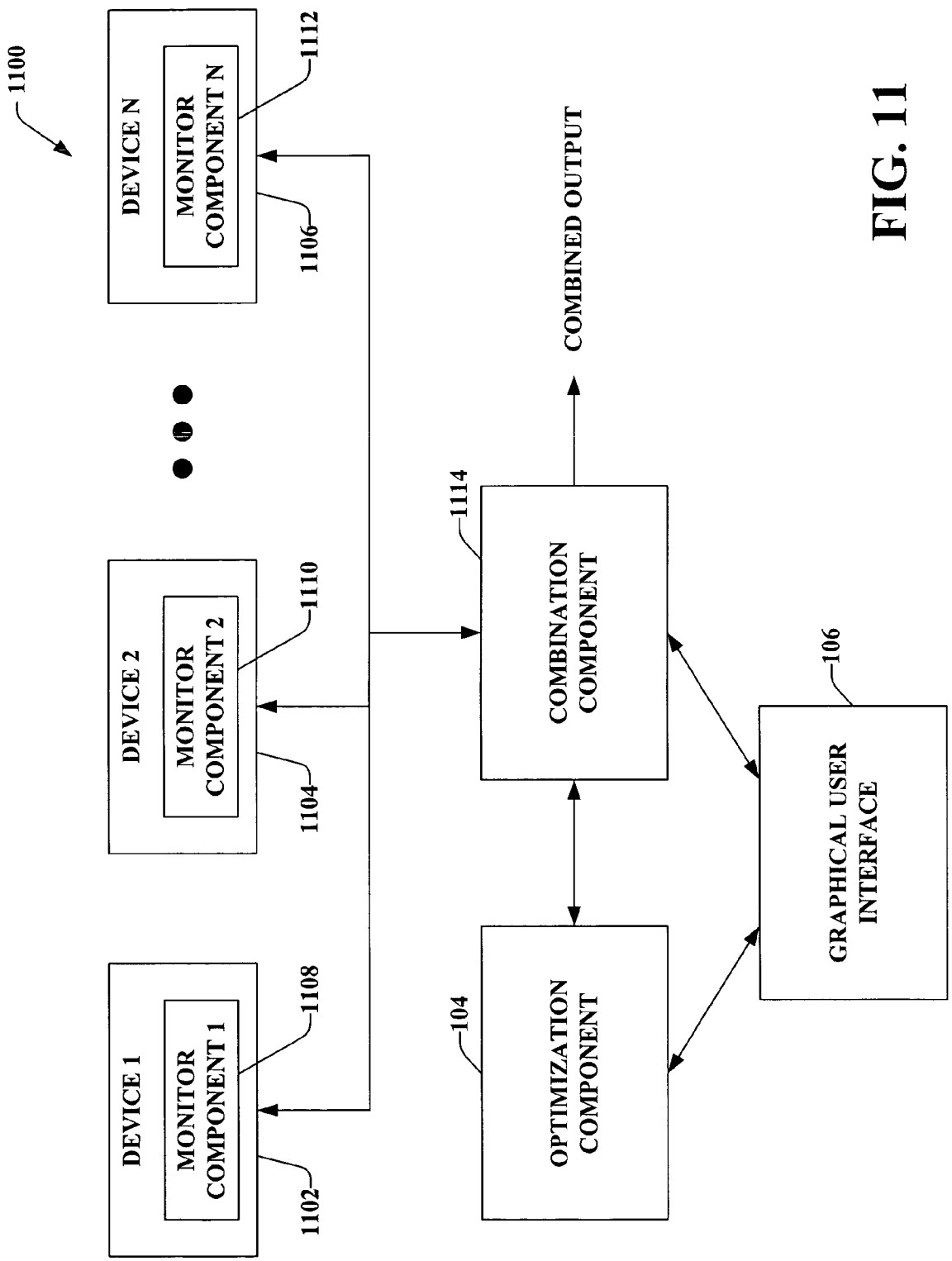
FIG. 11 illustrates a block diagram of an exemplary system that utilizes a voting configuration to implement an optimized utilization of available redundancy.

Referring to FIG. 11, illustrated is a system 1100 that utilizes a voting configuration to implement an optimized utilization of available redundancy. The system 1100 includes an optimization component 104 that can generate a voting configuration. For instance, the voting configuration can be provided by the optimization component 104 at a time of initialization of the system 1100, dynamically generated during operation of the system 1100, etc. Further, the system 1100 can include the graphical user interface 106 that generates a visualization related to safety and/or availability levels associated with the voting configuration. The system 1100 additionally can include N devices (e.g., device 1 1102, device 2 1104 . . . device N 1106), where N is any positive integer. It is contemplated that the N devices 1102-1106 can be any type of industrial automation device. By way of example, the N devices 1102-1106 can be input devices (e.g., sensor, . . . ), logic solving devices (e.g., programmable logic controller (PLC), . . . ), output devices (e.g., actuator, cylinder, diaphragm, relay, solenoid, motor controller, robot, servo motion device, . . . ), etc. Additionally, the N devices 1102-1106 can provide redundancy that can be configured to implement safety, availability, or a combination thereof.

The N devices 1102-1106 can comprise respective monitor components (e.g., monitor component 1 1108, monitor component 2 1110 . . . monitor component N 1112). Each of the monitor components 1108-1112 can be utilized to detect failures associated with a corresponding device (e.g., one of the N devices 1102-1106). Upon detecting a fault associated with a particular one of the devices 1102-1106, data can be provided to a combination component 1114 that can assemble information in accordance with the voting configuration. The data related to the fault can also be provided to the graphical user interface 106. Additionally or alternatively, the devices 1102-1106 can provide any type of output (e.g., in addition to or in place of fault related data identified by the monitor components 1108-1112) to the combination component 1114, which can harmonize the data to yield a combined output. It is contemplated that the combined output can be utilized in any manner. For instance, the combined output can be provided back to the devices 1102-1106 (e.g., to enable halting operation, continuing operation, modifying operation such as by reducing speed, torque, human exposure, . . . ). According to another example, the combined output can be employed by the optimization component 104 to facilitate generating an updated voting configuration.

Although depicted as included within the devices 1102-1106, it is contemplated that the monitor components 1108-1112 can be stand alone components. Additionally or alternatively, one monitor component can be utilized to evaluate the devices 1102-1106. According to this example, the monitor component can be included as part of the optimization component 104, the combination component 1114, the graphical user interface 106, a combination thereof, a stand alone component, etc. Further, although the combination component 1114 is illustrated as a separate component, it is contemplated that the devices 1102-1106 can be associated with corresponding combination components that can enable the devices to harmonize outputs in accordance with a voting configuration.

Pursuant to a further illustration, the combination component 1114 can utilize the voting configuration along with weights related to each of the devices 1102-1106. For instance, the weights can be associated with the ability of each of the devices 1102-1106 to provide accurate data to the combination component 1114. The weights relating to each of the devices 1102-1106 can be based at least in part upon a mean time between failures (MTBF), an age, a status, input sensors, history, and/or any associated characteristic, for example.

By way of illustration, one of the devices 1102-1106 can output a fault (e.g., as identified by the associated one of the monitor components 1108-1112). The combination component 1114 can provide for fault tolerance by utilizing a voting configuration provided by the optimization component 104 that enables continued operation when one of the devices 1102-1106 generates a fault while at the same time providing safety, for instance. Additionally or alternatively, it is contemplated that when one of the devices 1102-1106 yields a fault, operation can be at an original level, at a degraded level utilizing disparate system controlled measures such as, for example, reduced speed, torque, human exposure, etc. Further, data associated with such a fault can be provided to the graphical user interface 106 and can thereafter be logged, displayed, utilized to generate an updated visualization, etc.

Figure 12:
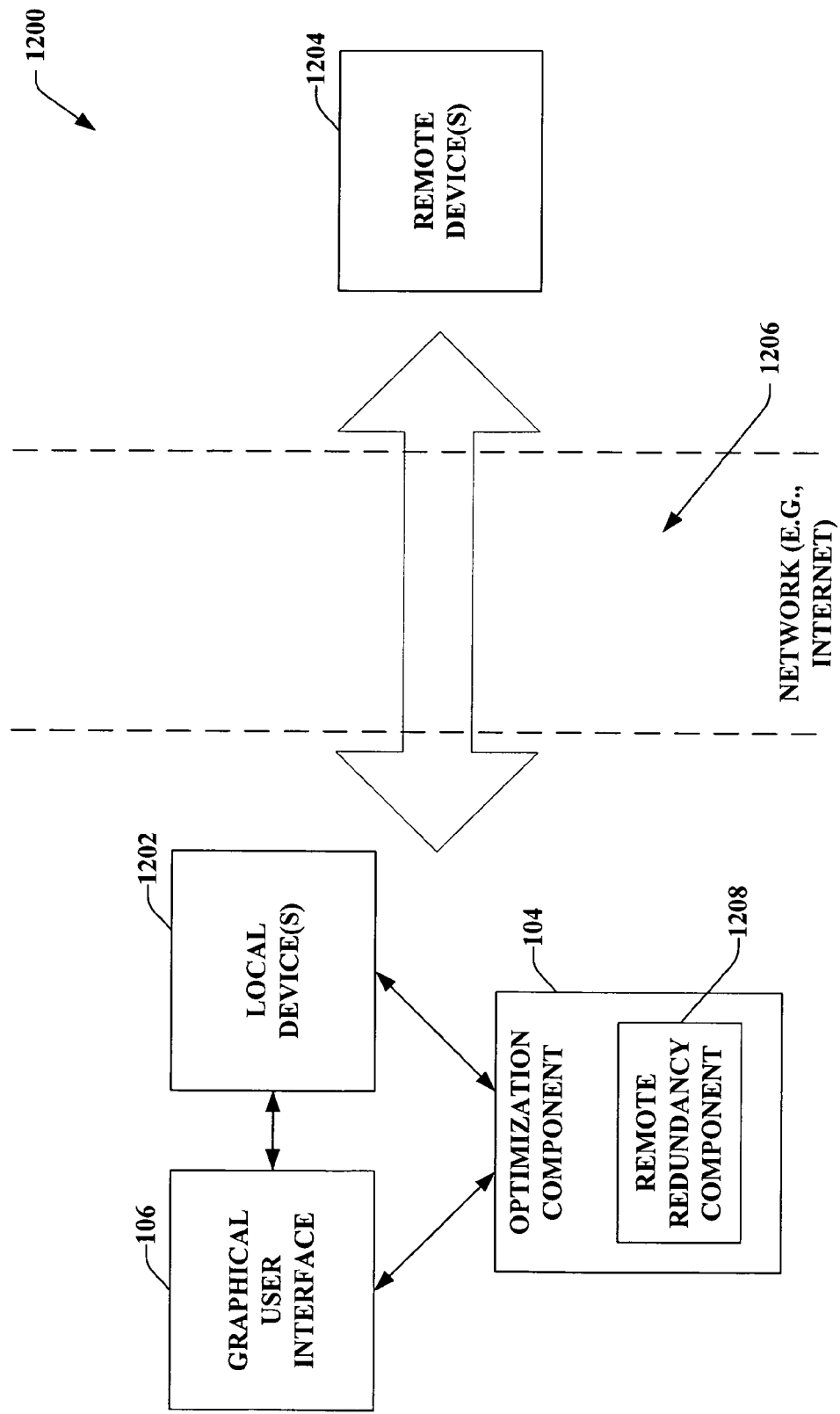
FIG. 12 illustrates a block diagram of an exemplary system that enables adding and/or removing redundancy from an industrial automation environment.

With reference to FIG. 12, illustrated is a system 1200 that enables adding and/or removing redundancy from an industrial automation environment. The system 1200 includes an optimization component 104 that can generate a voting configuration based on an available amount of redundancy. For example, the optimization component 104 can provide a voting configuration based on the redundancy associated with local device(s) 1202, which can be any industrial automation devices. The local device(s) 1202 can be, for instance, the devices that are located at a plant, utilized by a company, etc. If more redundancy is desired to provide increased safety and/or availability (e.g., shifting to a disparate arc as shown in FIG. 6), additional redundancy can be provided by remote device(s) 1204 (e.g., logic solvers, sensors, any industrial automation device, . . . ) which can be accessible via a network 1206 (e.g., the Internet). Additionally, an allocation of the redundancy (e.g., related to the voting configuration) can be provided to the graphical user interface 106, which can generate a visualization related to safety and/or availability levels. Further, the graphical user interface 106 can be employed by a user to facilitate altering the allocation of safety and/or availability, the amount of available redundancy, etc.

The optimization component 104 can include a remote redundancy component 1208 that can order, recognize, configure, employ, etc. additional redundancy provided by the remote device(s) 1204. By way of example, the remote device(s) 1204 can be supported by a third party provider and can enable increasing an amount of available redundancy. Thus, for instance, the additional redundancy can be provided on a short term basis, on a startup basis, as a cost effective alternative to buying additional hardware to implement added redundancy, etc. According to an illustration, it can be determined that additional redundancy is desired to provide enhanced safety and/or availability. Thus, the remote redundancy component 1208 can initiate adding such redundancy by communicating with a service provider that hosts the remote device(s) 1204 by way of the network 1206. The remote redundancy component 1208 can negotiate a type of device, cost, amount of redundancy, period of time, etc. with respect to which the remote device(s) 1204 can be employed in connection with the local device(s) 1202 to provide additional redundancy. Thereafter, the optimization component 104 can generate an updated voting configuration that accounts for the added redundancy. Additionally or alternatively, upon discontinuing utilization of the remote device(s) 1204, the optimization component 104 and/or the remote redundancy component 1208 can generate an updated voting configuration. Thus, utilization of the remote device(s) 1204 enables expanding an amount of available redundancy associated with an industrial automation environment. Although depicted as coupled to the local device(s) 1202, it is to be appreciated that the optimization component 104 can additionally or alternatively be provided remotely. Pursuant to an example, the optimization component 104 can be located at a remote location (e.g., hosted by a third party provider) and can generate a voting configuration based at least in part upon an amount of available redundancy associated with the local device(s) 1202 and/or any additional redundancy yielded by the remote device(s) 1204; however, the claimed subject matter is not so limited.

Figure 13:
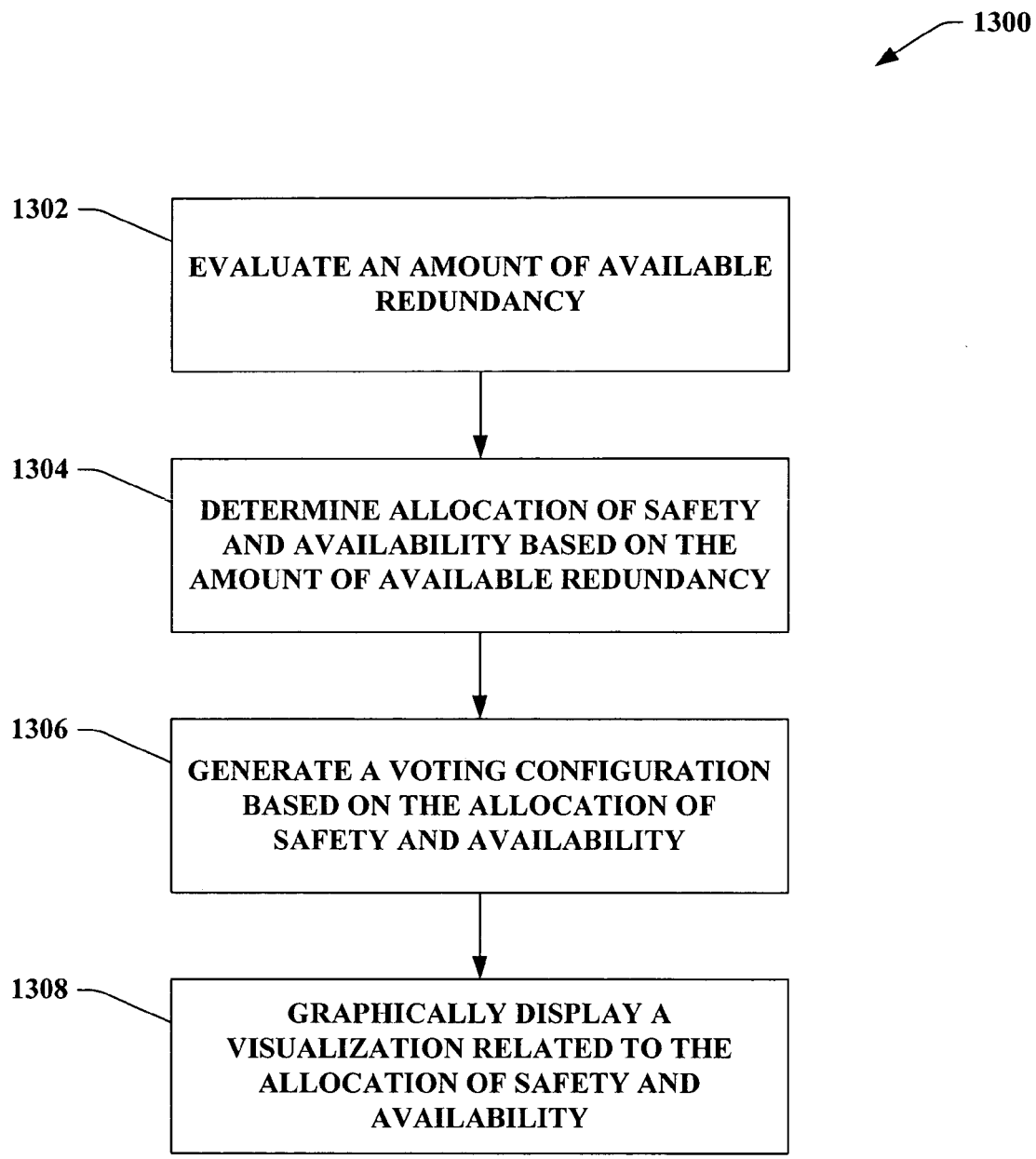
FIG. 13 is a representative flow diagram of a methodology that facilitates optimizing utilization of redundancy in an industrial automation environment.
Figure 14:
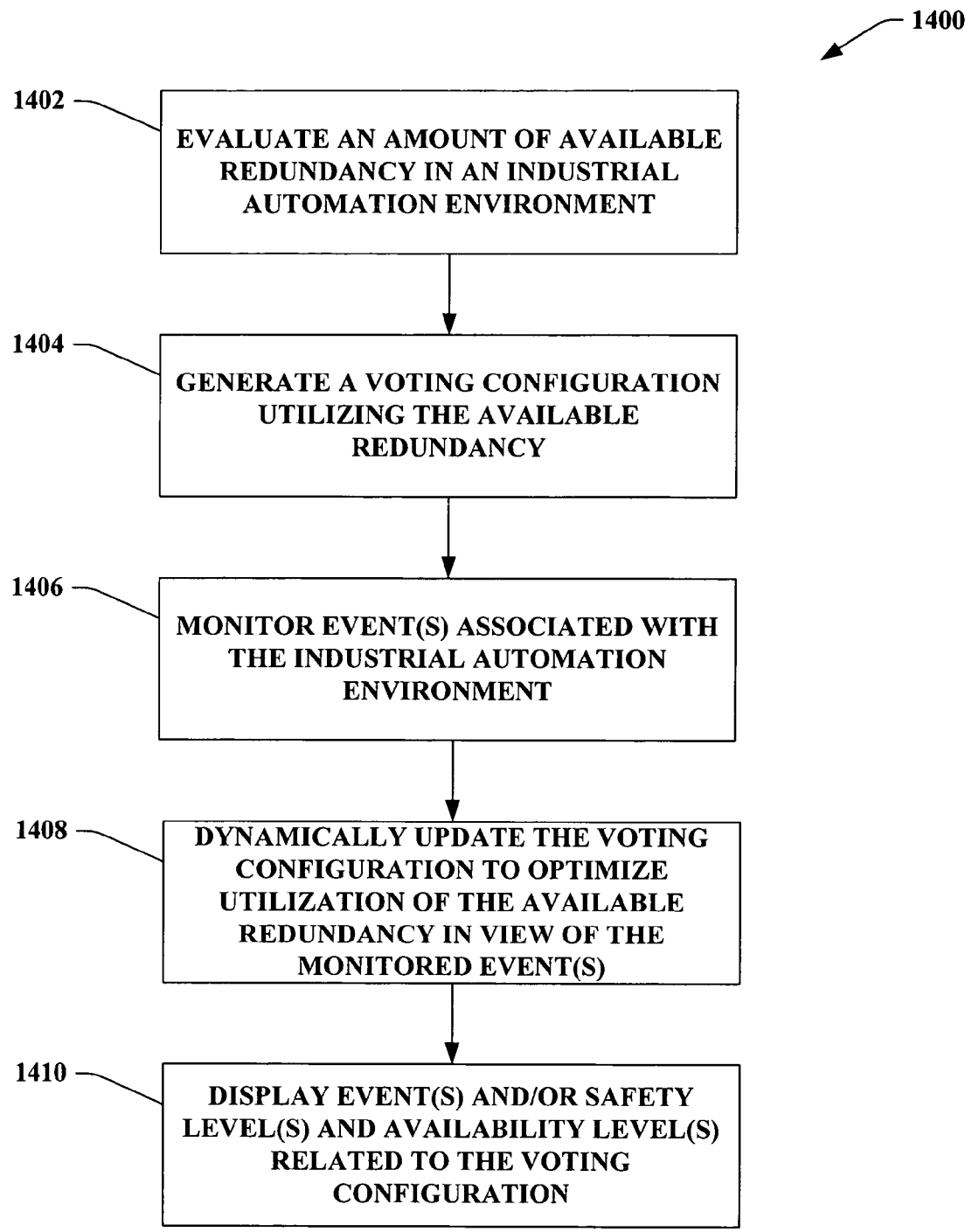
FIG. 14 is a representative flow diagram of a methodology that facilitates updating utilization of available redundancy in an industrial automation environment.

Referring to FIGS. 13-14, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 13, illustrated is a methodology 1300 that facilitates optimizing utilization of redundancy in an industrial automation environment. At 1302, an evaluation can be effectuated to determine an amount of available redundancy. For example, a determination can be made related to a number of industrial automation devices (e.g., logic solvers, sensors, . . . ) included in the environment, locations of the devices, status of the devices, associations between devices, etc. At 1304, an allocation of safety and/or availability can be determined based at least in part upon the amount of available redundancy. By way of example, a determination can be reached that can indicate that the allocation should provide for as much safety as possible given the amount of redundancy, as much availability as possible in view of the amount of redundancy, and/or some combination of safety and availability. The allocation between safety and availability can be identified, for instance, based on characteristic(s) associated with the industrial automation environment and/or a device, machine, process, etc. within the environment. Pursuant to an example, if a high level of risk of damage or injury exists, then the allocation can provide for a higher degree of safety as compared to availability. Meanwhile, if it is determined that downtime is associated with significant costs while the risk of damage and/or injury is not as great, then the redundancy can be allocated to provide a higher level of availability while reducing the level of safety. At 1306, a voting configuration can be generated based on the allocation of safety and availability. When generating the voting configuration, a number of factors can be considered such as, for instance, a likelihood of common mode failure, faults associated with various industrial automation devices (e.g., historical data related to faults, faults that are currently existent, . . . ), etc. The generated voting configuration can be utilized to combine outputs from a number of industrial automation devices. At 1308, a visualization related to the allocation of safety and availability can be graphically displayed. For instance, a safety level (e.g., safety integrity level) and/or an availability level can be graphically provided. It is to be appreciated that the visualization can utilize any manner of announcing the information associated with safety and/or availability; thus, by way of example, the allocation can be displayed utilizing a bar graph, a pie chart, a table, alphanumeric text, a scatter plot, etc.

With reference to FIG. 14, illustrated is a methodology 1400 that facilitates updating utilization of available redundancy in an industrial automation environment. At 1402, an amount of available redundancy in an industrial automation environment can be evaluated. The amount can be determined automatically upon including industrial automation devices into the environment, after configuring a device added to the environment, by way of user input, a combination thereof, etc. At 1404, a voting configuration can be generated that utilizes the available redundancy. Thus, a voting configuration can be yielded that provides for an optimized level of safety and/or availability. The voting configuration can thereafter be employed to combine outputs, measured values, faults, votes, etc. Additionally or alternatively, the voting configuration can be utilized by a graphical user interface to display data associated with safety and/or availability levels.

At 1406, event(s) associated with the industrial automation environment can be monitored. For instance, occurrence of a fault, addition and/or removal of industrial automation device(s) and/or redundancy, location of users, or any characteristic associated with the environment and/or one or more devices can be assessed. By way of example, a failure of a logic solver can be identified; however, the claimed subject matter is not so limited. At 1408, the voting configuration can be dynamically updated to optimize the utilization of the available redundancy in view of the monitored event(s). Pursuant to an example, when additional redundancy is provided, the voting configuration can be dynamically updated to readjust the allocation between safety and/or availability. According to another illustration, upon determining that a significant risk of harm (e.g., damage, injury, . . . ) exists, the voting configuration can be reconfigured to provide for a higher level of safety; thus, the updated voting configuration can provide for combining various information in a manner that yields a higher level of safety as compared to the prior voting configuration. It is to be appreciated that the claimed subject matter is not limited to the aforementioned examples. At 1410, data associated with the event(s) and/or data associated with safety level(s) and availability level(s) related to the voting configuration can be displayed. According to an example, the monitored event(s) and corresponding changes to the voting configuration (e.g., modifications to the safety and/or availability level(s), . . . ) can be displayed (e.g., in real time, . . . ) utilizing an event window. Additionally, a time corresponding to each of the event(s) can be included as part of the visualization in the event window. Pursuant to a further illustration, the safety level (e.g., safety integrity level) and the availability level associated with the updated voting configuration can be displayed. Further, a visualization can depict changes in the safety level and/or the availability level (e.g., modifications associated with different voting configurations) over time.

Figure 15:
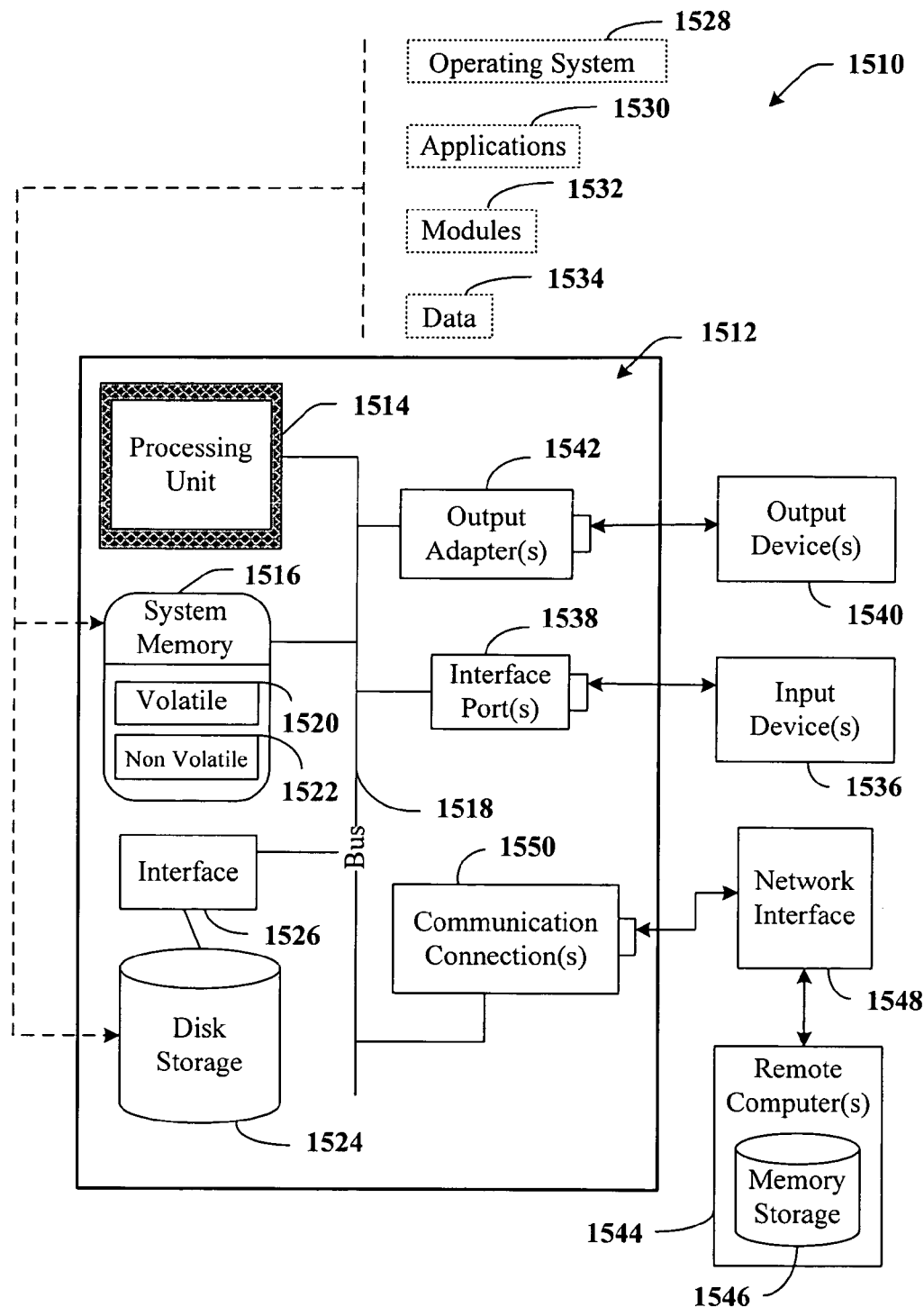
FIG. 15 is an example operating system upon which various features described herein can be implemented.

With reference to FIG. 15, an exemplary environment 1510 for implementing various aspects includes a computer 1512.

The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject innovation can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

Figure 16:
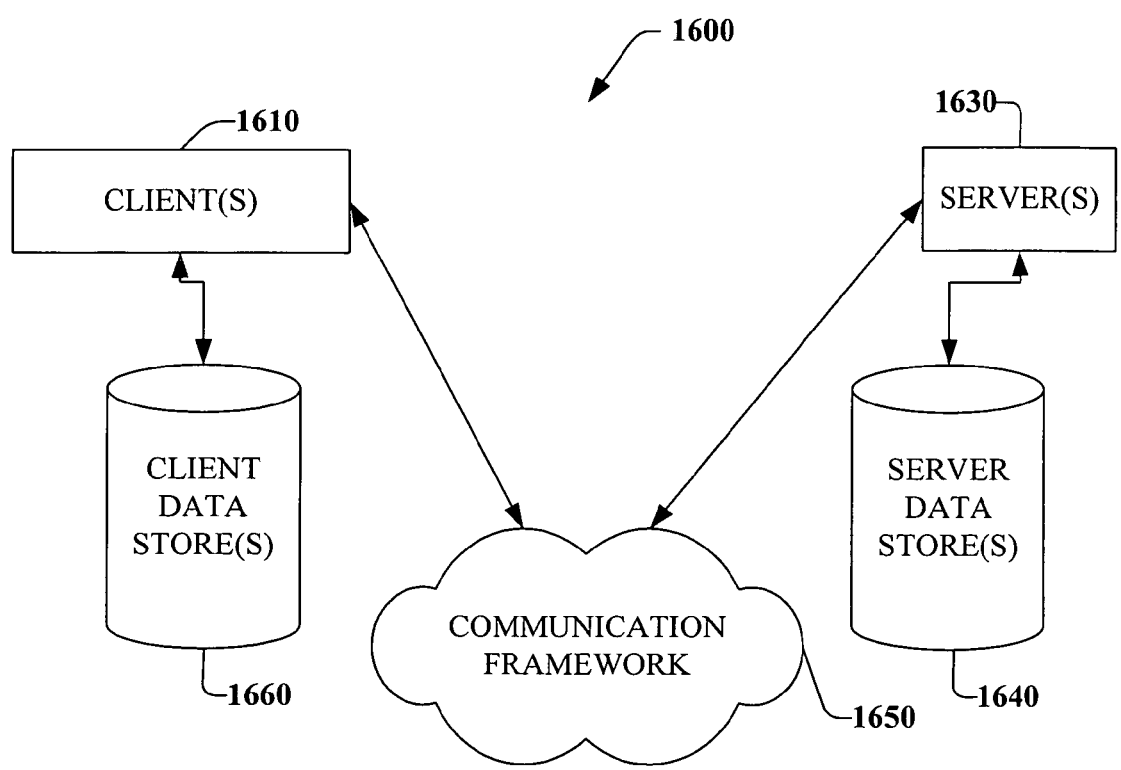
FIG. 16 is an exemplary computing environment within which various features described herein can interact.

FIG. 16 is a schematic block diagram of a sample-computing environment 1600 with which the claimed subject matter can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the subject innovation, for example. One possible communication between a client 1610 and a server 1630 can be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

What has been described above includes examples of the innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system that visualizes availability and safety levels, comprising:
    an optimization component that generates a voting configuration that provides an optimized combination of a safety level and an availability level based upon available redundancy, the optimization component evaluates the safety level by summing probabilities of failure associated with each device; and
    a graphical user interface that presents a visualization of the safety level and the availability level, the graphical user interface displays a graph that depicts the availability level of a safety function against the safety level by employing a movable marker that indicates the availability level.

2. The system of claim 1, the graphical user interface employs the visualization to model at least one of a current condition, a trend, an adjustment, and historical data.

3. The system of claim 1, the graphical user interface utilizes the visualization to obtain runtime feedback.

4. The system of claim 1, the graphical user interface utilizes safety integrity levels as provided by IEC 61508.

5. The system of claim 1, the graphical user interface continuously monitors at least one of the safety level and the availability level.

6. The system of claim 1, the graphical user interface obtains a periodic notification associated with a change in at least one of the safety level and the availability level.

7. The system of claim 1, the graphical user interface receives information utilized to generate the visualization in response to at least one of a time-out and a request.

8. The system of claim 1, the graphical user interface displays event related information pertaining to at least one of a fault and a remediation related to the fault.

9. The system of claim 1, the bar graph includes disparate sections related to various states of a process.

10. The system of claim 1, the graphical user interface maintains a log of operational devices.

11. The system of claim 1, the graphical user interface displays an event window that presents data associated with events, times at which the events occurred, and transitions that resulted due to the events.

12. The system of claim 1, the graphical user interface receives a user input and alters the optimized combination based on the user input.

13. The system of claim 1, further comprising a monitor component that detects a failure associated with an industrial automation device.

14. The system of claim 13, the monitor component provides data related to the failure to the graphical user interface to enable generating the visualization, the data includes at least one of a type of failure, a device associated with the failure, a process associated with the failure, and a time of the failure.

15. The system of claim 13, the monitor component yields a response to the detected failure and provides data related to the response to the graphical user interface.

16. The system of claim 1, further comprising an initialization component that generates an initial voting configuration at a time of setup and provides the initial voting configuration to the graphical user interface, the graphical user interface employs the initial voting configuration to yield the visualization.

17. The system of claim 1, further comprising a dynamic configuration component that adjusts the optimized combination to generate an updated voting configuration based at least in part upon a monitored real time event.

18. The system of claim 17, the graphical user interface modifies the visualization according to the adjusted combination associated with the updated voting configuration.

19. A method that facilitates visualizing an optimized utilization of redundancy in an industrial automation environment, comprising:
    determining an optimized combination of a safety level and an availability level based at least in part upon an amount of available redundancy, wherein the safety level is evaluated by summing probabilities of failures with each device; and
    displaying a visualization comprising a graph that employs a movable marker and announces the safety level and the availability level related to the optimized combination.

20. The method of claim 19, further comprising computing at least one of the safety level and the availability level during system configuration time.

21. The method of claim 20, further comprising:
    receiving data that comprises at least one of a voting configuration, information associated with a safety function, a list of associated devices, availability versus safety integrity levels per device, and descriptions of modifications to a process corresponding to changes in integrity levels; and
    generating the visualization based at least in part upon the received data.

22. The method of claim 19, further comprising computing at least one of the safety level and the availability level during run-time.

23. The method of claim 22, further comprising receiving an implicit message from an industrial automation device that includes information utilized to compute at least one of the safety level and the availability level.

24. The method of claim 22, further comprising receiving an explicit message from an industrial automation device that includes information utilized to compute at least one of the safety level and the availability level.

25. The method of claim 19, further comprising displaying information associated with monitored events.

26. The method of claim 25, displaying information that relates to at least one of an occurrence of a fault, a remediation associated with the fault, an addition of redundancy, a removal of redundancy, a change in safety level, a change in availability level, and a time corresponding to the event.

27. The method of claim 25, further comprising receiving data related to the monitored event in response to at least one of a time-out and a request.

28. The method of claim 19, displaying the visualization further comprises displaying a bar graph that depicts the availability level by way of an indicator versus the safety level.

29. The method of claim 28, further comprising moving the indicator to visualize a change associated with at least one of the safety level and the availability level.

30. The method of claim 19, displaying the visualization further comprises displaying an event window that includes information associated with a monitored event and a corresponding change to a voting configuration.

31. The method of claim 19, further comprising receiving a user input and modifying at least one of the safety level and the availability level based at least in part on the user input.

32. A system that depicts availability and safety related to an industrial automation environment, comprising:

means for evaluating safety level by summing probabilities of failure associated with each device;

means for optimizing an allocation of an amount of available redundancy to provide a balance between safety and availability; and means for displaying the optimized allocation by graphically representing a safety level and an availability level and by employing a movable marker that indicates the availability level.

* * * * *